May 27, 1924.
J. H. TULL
1,495,821
ADJUSTABLE CYCLORAMA JOINT
Filed June 21, 1921
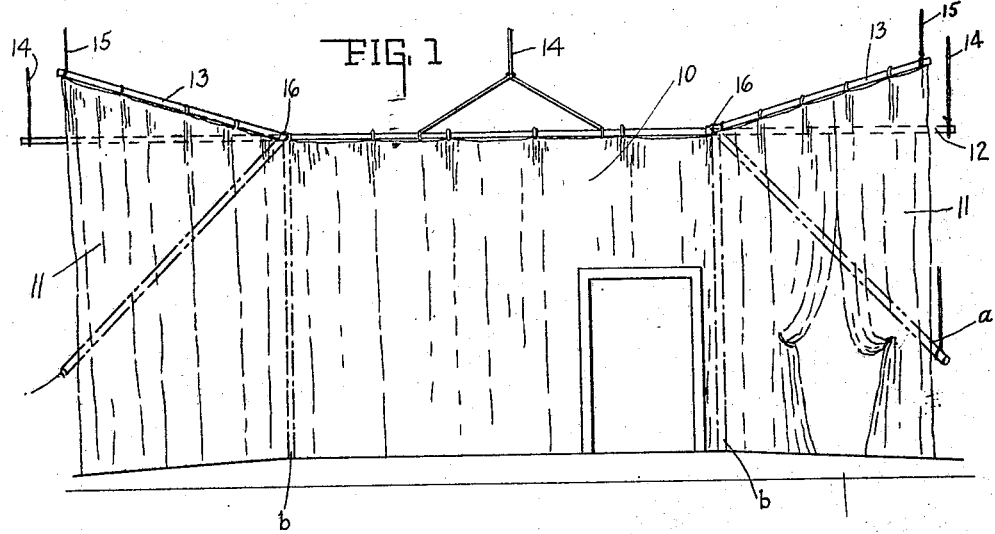
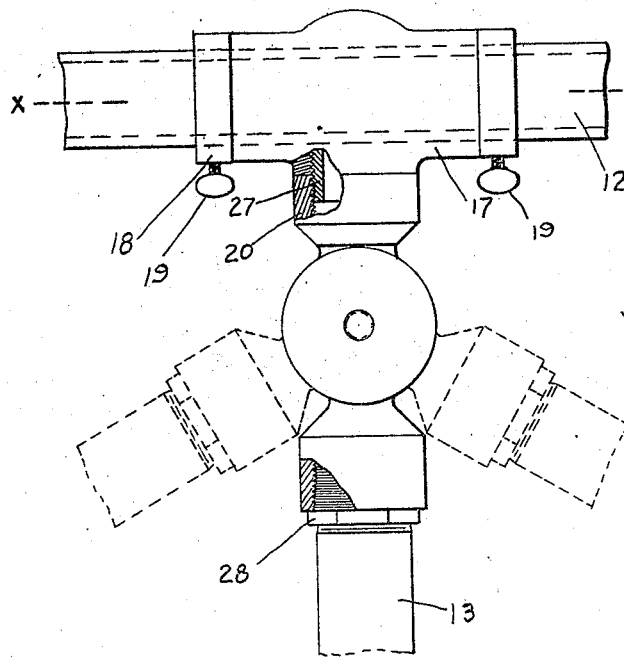
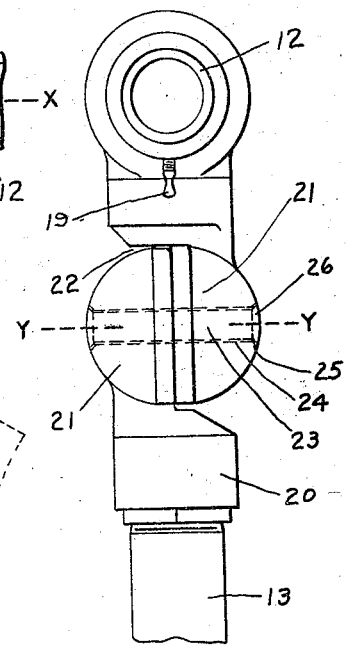
INVENTOR.
JOHN H. TULL.
BY
ATTORNEYS Patented May 27, 1924.

1,495,821

UNITED STATES PATENT OFFICE.

JOHN H. TULL, OF INDIANAPOLIS, INDIANA.

ADJUSTABLE CYCLORAMA JOINT.

Application filed June 21, 1921. Serial No. 479,306.

*To all whom it may concern:*

Be it known that I, JOHN H. TULL, a citizen of the United States, and a resident of Indianapolis, county of Marion, and State of Indiana, have invented a certain new and useful Adjustable Cyclorama Joint; and I do hereby declare that the following is a full, clear, and exact description thereof, reference being had to the accompanying drawings, in which like numerals refer to like parts.

This invention relates to cyclorama curtains, and particularly the means for supporting the same.

The chief object of this invention is to provide a support for a cyclorama curtain with a cyclorama joint of improved construction.

The chief feature of the invention consists in providing means whereby the cyclorama joint may be adjustably positioned upon a support for a cyclorama curtain, and which will permit the wing portions of said curtain to be dropped, or collapsed, as desired, and which will also permit said wing portions of the cyclorama curtain to be positioned at any desired angle to the back portion.

Another feature of the invention is the simplicity of construction of the joint, whereby the several parts of the cyclorama curtain support when in collapsed relation will be positioned in a compact manner heretofore impossible to attain.

The full nature of the invention will be understood from the accompanying drawings and the following description and claims.

In the drawings, Fig. 1 is a front view of a cyclorama curtain showing the wing portions thereof at an angle to the back portion, and the wing supporting portions in two dotted line positions. Fig. 2 is an enlarged plan view of the adjustable cyclorama joint. Fig. 3 is an end view of the same.

In the drawings 10 indicates the back portion of a cyclorama curtain, and 11 indicates the two wings thereof. The support for the cyclorama curtain consists of an elongated supporting member 12, which elongated member, as shown clearly in Figs. 2 and 3, preferably consists of a tubular metal pipe, which tubular metal pipe combines great rigidity and strength with great lightness in weight. The wing portions 11 of the cyclorama curtain are supported by other supporting members 13, which, as shown clearly in Figs. 2 and 3, also are preferably metallic tubular members, such as a metal pipe. Suitable means, such as the cables, ropes, etc. 14, support the supporting member or pipe 12 in the desired position, and any suitable means, not shown, may be associated with said cable means, whereby said curtain and the support may be elevated into the loft on the stage of a theatre. There is also illustrated in Fig. 1 the supporting ropes or cables 15, which are secured to the wing supporting members 13 in any suitable or preferred manner, and which are also associated with suitable means in the loft of the theatre or room, whereby said supporting member with its wing portion 11 of the curtain may be swung at any desired angle to the back portion 10 thereof, or may be collapsed, as shown by the dotted lines $b$ in Fig. 1. The dotted lines $a$—$a$ indicate intermediate positions of the wing supporting members 13. When the wing supporting members 13 are dropped from the position shown by the full lines in Fig. 1 to the dotted line position at $a$ and then at $b$, the wing portion of the curtain folds itself and hangs vertically adjacent the joint, which is herein designated generally by the numeral 16. The entire curtain thereupon may be moved from the stage or room into the loft by elevating the rod 12 through the cable or rope means 14.

Reference will now be had to Figs. 2 and 3, wherein the cyclorama joint is illustrated in detail. The joint consists of a hollow substantially T-shaped supporting member 17, which is preferably metallic. The tubular support, such as the iron pipe 12, slidably supports the T-shaped supporting member 17; and said longitudinal sliding movement is limited in each direction by suitable means, such as the rings or collars 18, which are rigidly secured to the supporting tubular member 12 by any suitable means, such as the finger bolts or set screws 19. Thus, it will be noted that the collars 18 may be adjusted at any position along the support 12 as desired, and said collars thereupon prevent longitudinal movement of the T-shaped member 17 upon the supporting member 12, but do not prevent rotational movement of said T-shaped member 17 about the axis $x$—$x$ of the supporting member 12.

Although several different methods of construction may be employed to provide a swivel joint substantially at right angles to the axis $x$—$x$, the following is the preferred form of construction, since several standard parts may be utilized and but two similar non-standard parts are required. In Figs. 2 and 3, there are two substantially similar members having hollow threaded portions 20 and the swivel-forming plate portion 21, which in the present instance is shown semi-spherical in form. The body portion 20 adjacent its connection with the swivel portion 21 is cut away at 22, so that two swivel portions 21 may be oppositely positioned with respect to each other and form a complementary construction, whereby a swivel joint is secured, having the axis $y$—$y$, see Fig. 3. The means for pivotally or swivelably supporting these two members consists of a pin or pivot 23, which is receivable by the registering openings 24 in the plate portions 21. The openings 24 are enlarged or countersunk at 25 to receive the head portions 26 of the pin 23, so that a flush construction, as well as a neat construction, will be secured. Thus, there are no protruding parts which will engage or tear the cyclorama curtain.

The means for connecting the adjacent body portion 20 with the T-shaped supporting member, comprises a standard nipple 27, and these three members may be welded or otherwise secured together, if desired, or the body portion 20 may be formed integral with the T-shaped member 17. Associated with the other body portion 20 is an adaptor, such as a coupling 28, which has a threaded engagement with the threaded portion of said body portion, and has a threaded engagement with the wing supporting member 13, as shown in Figs. 2 and 3.

Thus, the joint provides that the supporting member 13 has rotational movement about the axis $y$—$y$, so that said supporting member 13 may be positioned at any angle to the supporting member 12 to position the wings 11 at any angle to the back portion 10 of the cyclorama curtain as indicated by the dotted lines in Fig. 2. The swiveling of the joint about the axis $x$—$x$ provides that the supporting member 13 with the wing portion of the curtin may be lowered into the dotted line position $b$—$b$, shown in Fig. 1, and the curtain may thereupon be elevated into the loft in its collapsed position. When in such position, it has been experimentally determined that a clearance of but three inches is required since the supporting member 12 may be of one inch iron pipe, or of somewhat similar size.

The invention claimed is:

In a cyclorama joint, the combination of two substantially similar complementarily positioned pivotally associated members, each having a threaded end portion, one of said members being adapted to support a cyclorama wing supporting member, and a supporting portion rotatably supported upon an axis at right angles to said pivotal axis and connected to the other complementary member for supporting the same and the cyclorama wing supporting member to provide universal movement of the wing with respect to the rotatable support.

In witness whereof, I have hereunto affixed my signature.

JOHN H. TULL.